(12) United States Patent
Schwartz et al.

(10) Patent No.: US 8,204,924 B1
(45) Date of Patent: Jun. 19, 2012

(54) VARIABLE PRECISION WAVELETS

(75) Inventors: David Schwartz, Moorpark, CA (US); Yuri Owechko, Newbury Park, CA (US); Roy Matic, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1819 days.

(21) Appl. No.: 11/189,147

(22) Filed: Jul. 25, 2005

Related U.S. Application Data (63) Continuation of application No. 09/455,032, filed on Dec. 6, 1999, now abandoned.

(51) Int. Cl.
*G06F 17/14* (2006.01)

(52) U.S. Cl. ...................................................... 708/400

(58) Field of Classification Search .......... 708/400–409, 708/300–323
See application file for complete search history.

(56) References Cited

U.S. PATENT DOCUMENTS

| | | | |
|---|---|---|---|
| 5,014,134 A | 5/1991 | Lawton et al. | |
| 5,453,945 A | 9/1995 | Tucker et al. | |
| 5,748,786 A | 5/1998 | Zandi et al. | |
| 5,764,807 A | 6/1998 | Pearlman et al. | |
| 5,850,482 A | 12/1998 | Meany et al. | |
| 5,929,913 A | 7/1999 | Etoh | |
| 6,038,579 A | 3/2000 | Sekine | |
| 6,208,951 B1 | 3/2001 | Kumar et al. | |
| 6,216,145 B1 * | 4/2001 | Zandi et al. | 708/400 |
| 6,256,608 B1 * | 7/2001 | Malvar | 704/230 |
| 6,351,570 B1 * | 2/2002 | Kobayashi | 382/250 |
| 6,434,253 B1 * | 8/2002 | Hayashi et al. | 382/100 |
| 6,757,326 B1 * | 6/2004 | Prieto et al. | 708/400 |

OTHER PUBLICATIONS

Choi, H. et al. "Optimal wordlength assignment for the discrete wavelet transform in VLSI" VLSI Signal Processing, VIA (Cat. No. 93TH0533-0). Proceedings of IEEE Workshop on VLSI Signal processing, Veldhoven, Netherlands, Oct. 20-22, 1993, pp. 325-333, XP002173947 1993.

Zandi, A. et al. "CREW: Compression with Reversible Embedded Wavelets" Proceedings. DCC '95 Data Compression Conference (Cat. No. 95TH8037), Snowbird, UT, USA, Mar. 28-30, 1995, pp. 212-221, XP002173948 1995.

Louie, M. et al.: "Multiplication and inner product with field programmable gate arrays" VLSI Signal Processing VII (Cat. No. 94TH8008), Proceedings of 1994 IEEE Workshop on VLSI Signal Processing, La Jolla, CA, USA, Oct. 26-28, 1994, pp. 246-255, XP002173949 1994.

Jo Yew Tham et al. "Highly scalable wavelet-based video codec for very low bit-rate environment" IEEE Journal on Selected Areas in Communications, Jan. 1998, IEEE, USA, vol. 16, No. 1, pp. 12-27, XP002173950.

Grzeszczak, A. et al. "VLSI implementation of discrete wavelet transform" IEEE Trans. Very Large Scale Integr. (VLSI) Syst. (USA), IEEE Transactions on Very Large Scale Integration (VLSI) Systems, Dec. 1996, IEEE, USA, vol. 4, No. 4, pp. 421-433, XP002173951.

(Continued)

*Primary Examiner* — David H Malzahn
(74) *Attorney, Agent, or Firm* — Tope-McKay & Assoc.

(57) ABSTRACT

A method and apparatus are presented for performing wavelet transforms, post transform processing and inverse wavelet transforms whereby hardware complexity is reduced and processor performance is enhanced by performing the forward and inverse wavelet transformations and post transform processing in variable precision arithmetic. Optimal decreases in the operational arithmetic precision of different wavelet scale coefficients, multiplication and weighting operations, and other operations, results in reduced computational complexity, increased speed, and in some cases better signal to noise ratios.

9 Claims, 7 Drawing Sheets

OTHER PUBLICATIONS

Usevitch, B. E., et. al. "Fixed-point error analysis of two-channel perfect reconstruction filter banks with perfect alias cancellation" IEEE Transactions on Circuits and Systems II: Analog and Digital Signal Processing, Nov. 1999, IEEE, USA, vol. 46, No. 11, pp. 1437-1440, XP002173952.

M.J. Shensa, "Discrete Wavelet Transforms: The Relationship of the 'A Trous and Mallat Algorithms," Trezieme Collque Sur Le Traitement Di Signal et des Images, Sep. 16, 1991.

S. Mallat, "Multifrequency Channel Decompositions of Images and Wavelet Models," IEEE Trans. Acoustics, Speech, and Signal Processing, vol. 3. No. 12, Dec. 1989.

S. Mallet, "A Theory for Multiresolution Signal Decomposition: The Wavelet Representation," IEEE Trans. on Pattern Analysis and Machine Intelligence, vol. 11, No. 7, Jul. 1989.

Vetterli, et al., "Wavelets and Filter Banks: Theory and design," IEEE Transactions on signal Processing, vol. 40, No. 9, Sep. 1992.

Rioul, et al., "Fast Algorithms for Discrete and Continuous Wavelet Transforms," IEEE Transactions on Information theory, vol. 38, No. 2, Mar. 1992.

Flandrin, et al., "Generalized Target Description and Wavelet Decomposition," IEEE Transactions on Acoustics, Speech, and Signal Processing, vol. 38, No. 2, Feb. 1990.

Z. Xiong, et al., "Wavelet Packet Image Coding Using Space-Frequency Quantization," Jun. 1998, IEEE Trans. on Image Processing, vol. 7, pp. 892-898.

M. Antionini, et al., "Image Coding Using Wavelet Transform," Apr. 1992, IEEE Trans. on Image Processing, vol. 1, pp. 205-220.

T. Denk, "Synthesis of Folded Pipelined Architectures for Multirated DSP Algorithms," Dec. 1998, IEEE Trans. on Very Large Scale Integration Systems, vol. 6, pp. 595-607.

K-C. Hung, et al., "FPGA Implementation for 2D discrete Wavelet Transform," Apr. 1998, IEEE Electronics Letters, vol. 34, pp. 639-640.

S. Yao, "Signal-adapted Wavelet filter Bank Design," Mar. 1998, IEEE Electronics Letters, vol. 34, pp. 434-436.

S-F Hsiao, "VLSI Implementation of the Quadratic-Spline W-Transform for multi-resolution Image Processing," IEEE Electronics Letters, vol. 34, pp. 258-259.

B.J. Falkowski, "Forward and Inverse Transformations Between Haar Wavelet and Arithmetic Functions," IEEE Electronics Letters, vol. 34, pp. 1084-1085.

N.B. Karayiannis, et al., "Image Compression Based Fuzzy Algorithms for Learning Vector Quanization and Wavelet Image Decompositon," IEEE Trans. on Image Proc., Aug. 1998, vol. 7, pp. 1223-1230.

J. Zhang, et al., "A Wavelet-Based Multiresolution Statistical model for Texture," IEEE Trans. on Image Proc., Nov. 1998, vol. 7, pp. 1621-1627.

D. Marpe, et al., "Complexity-constrained Best-basis wavelet packet algorithm for image compression," IEEE Image Signal Processing, Dec. 1998, vol. 145, pp. 391-398.

A.B. Watson, et al., "Visibility of Wavelet Quantization Noise," IEEE Trans. on Image Proc., Aug. 1997, vol. 6, pp. 1164-1175.

S.D. Haynes, et al., A Reconfigurable Multiplier Array for Video Image processing Tasks, Suitable for Embedding in an FPGA Structure.

* cited by examiner

VARIABLE PRECISION WAVELETS

CROSS-REFERENCE TO RELATED APPLICATIONS

The present application is a Continuation of U.S. patent application Ser. No. 09/455,032, filed Dec. 6, 1999, titled "Variable Precision Wavelets," now abandoned.

FIELD OF THE INVENTION

The invention is generally related to wavelet based analysis and processing techniques. More specifically the invention pertains to variable precision wavelet-based arithmetic operations.

BACKGROUND

As interactive mediums such as the Internet and teleconferencing gain popularity, demands on data transmission bandwidth also grow. The growth is currently so explosive that demand may soon exceed capacity. When demand outstrips capacity, data transmission is slowed and transmissions are more prone to error. Obvious solutions include increasing bandwidth capacity or, alternatively, reducing bandwidth demand. Updating existing transmission lines and installing new switching equipment, as a means for increasing capacity, is both costly and time consuming. Reducing bandwidth demand can be inexpensively accomplished by better compression techniques. Compression techniques reduce transmission bandwidth requirements by transmitting fewer bits. The effect of transmitting fewer bits is reduced transmission time and an opportunity to transmit more information in less time.

One problem with state of the art compression and processing technology is manifested in applications where hardware size and processing speed are significant issues, as is the case with many small-scale portable circuits. In such situations, size and speed are critical criteria. Striking the right balance between size and speed is further complicated by the need to limit power consumption. Failure to properly balance these parameters will result in a sub-optimal system. State of the art systems have inseparably coupled speed with circuit complexity, and circuit complexity with size, cost, and power requirements. Since portable units are generally dependent on portable power sources, power consumption must be minimized or the advantages achieved through reductions in apparatus size will be lost with the attachment of oversized power supplies. Furthermore, power consumption generates heat, which can have both long and short-term deleterious effects on micro-circuitry.

The need for more effective and efficient data transformation and processing techniques is ongoing, but such improvements must not be performed at the cost of data quality. The post transformation data needs to be both present and distinguishable from noise or other spurious signals. Many of the issues discussed in the foregoing are not unique to data compression but apply to the field of data manipulation and processing as a whole. For instance, optimizing computational complexity and power consumption are desirable in most data processing systems. Thus, artisans are faced with competing goals. First: optimally sparsening data, so as to minimize processing, transmission, and storage requirements without losing critical data, and second: performing the first goal in a manner that is neither too costly nor so complex that slow hardware obviates the advantages of the data sparsening.

A growing body of literature exists regarding wavelet transformation technology concerning both theoretical and practical applications, as surveyed by the following articles, which are herein incorporated by reference:

S. Mallat, "Multifrequency Channel Decompositions of Images and Wavelet Models," IEEE Trans. Acoustics, Speech and Signal Processing, vol. 3 No. 12 December 1989.

S. Mallat, "A Theory for Multiresolution Signal Decomposition: The Wavelet Representation," IEEE Trans. on Pattern Analysis and Machine Intelligence, vol. 11 No. 7, July 1989.

Vetterli et al., "Wavelets and Filter Banks: Theory and Design", IEEE Transactions on Signal Processing, vol. 40, No. 9, September 1992.

Rioul et al., "Fast Algorithms for Discrete and Continuous Wavelet Transforms", IEEE Transactions on Information Theory, vol. 38, No. 2, March 1992.

M. J. Shensa, "Discrete Wavelet Transforms: The Relationship of the a Trous and Mallat Algorithms", Trezieme Colloque Sur Le Traitement Di Signal et des Images, 16 Sep. 1991.

Flandrin et al., "Generalized Target Description and Wavelet Decomposition", IEEE Transactions on Acoustics, Speech, and Signal Processing, vol. 38, No. 2, February 1990.

SUMMARY OF THE INVENTION

The present invention provides a data manipulation means and apparatus wherein computational complexity is minimized. An embodiment of the present invention provides a method for performing variable precision wavelet transformations and post-transformation processing which includes the steps of providing a data set; performing a wavelet transformation on the data set to produce a plurality of wavelet transform coefficients wherein each coefficient has a response; optionally performing at least one post-transformation data processing step on the plurality of wavelet transform coefficients to produce a plurality of modified wavelet transform coefficients; and performing an inverse wavelet transformation on the plurality of modified wavelet transform coefficients to produce an altered version of the data set provided in step a; and wherein at least one or more of the steps is performed using scale-based variable precision arithmetic.

In another embodiment of the present invention, a method for performing variable precision wavelet transformations and post-transformation processing as described above is presented, wherein the data set provided is a system of linear algebra equations, and wherein at least one post-transformation data processing step includes a data manipulation step including the sub-step of performing a selective sparsening operation on the data set, wherein the sparsening operation criteria is determined by operator or apparatus supplied instructions.

Yet another embodiment of the present invention is an apparatus for performing scale-based variable precision wavelet transformations and post-transformation processing with reduced computational complexity; wherein the wavelet transformations and post-transformation processing are performed in scale based, variable precision arithmetic.

Yet another embodiment of the present invention is an apparatus for performing variable precision wavelet transformations and post-transformation processing with reduced computational complexity as described above, wherein the wavelet transformations are performed on any logic device where instantitiated functions with different precisions are used for different scale factors.

DETAILED DESCRIPTION

A method and apparatus for variable precision wavelet transformation, post transformation processing, and inverse transformation is described. In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, values, elements, files, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "processing", "calculating", "determining", or "displaying" refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices.

The present invention also relates to apparatus for performing the operations herein disclosed. This apparatus may be specially constructed, as an application specific integrated circuit (ASIC), as a readily reconfigurable device such as a field programmable gate array (FPGA), or a general-purpose computer that has been selectively activated or configured. The processes presented herein are not inherently related to any particular processor, processor component, computer, software, or other apparatus.

Figure 6:
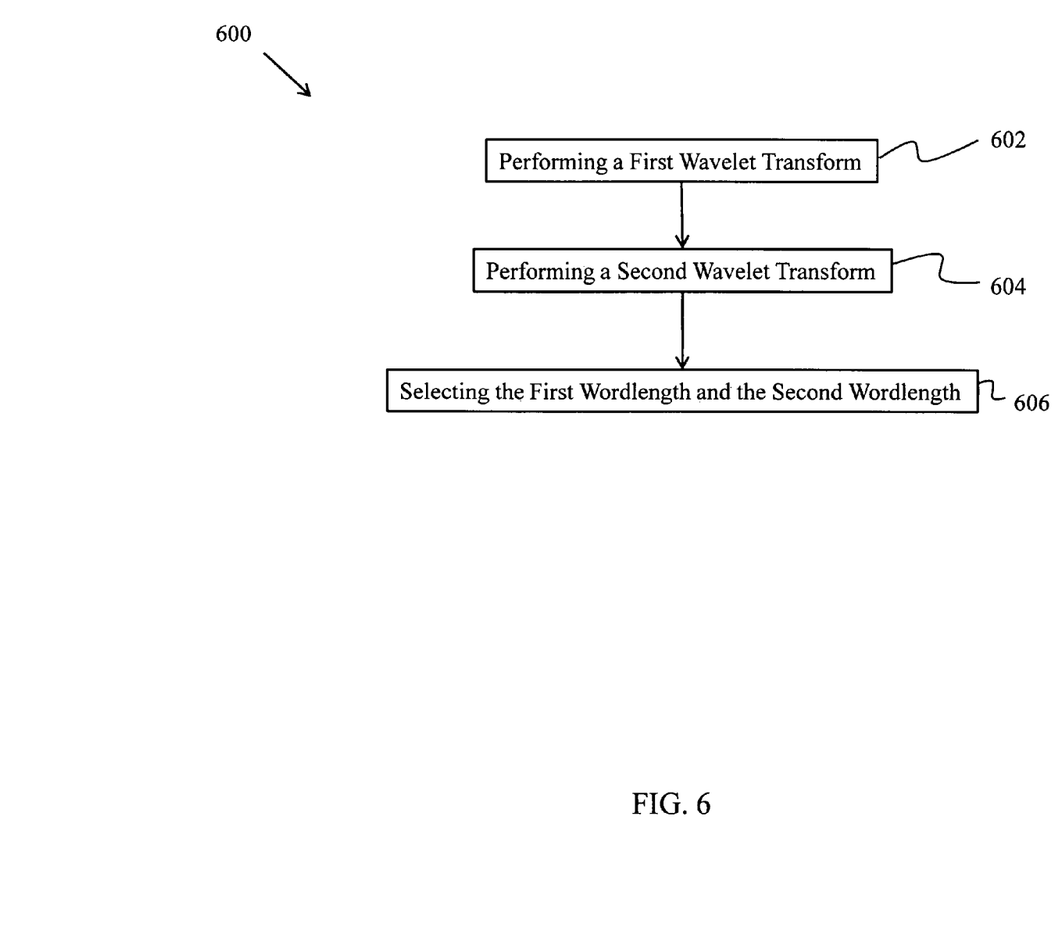
FIG. 6 is a flow chart depicting a process according to the present invention.

In summary, and as depicted in FIG. 6, the present invention includes a computer-implemented method 600 for wavelet transformations having a plurality of wavelet transform levels corresponding to scale factors. The method 600 comprises an act of causing a specifically encoded processor to perform operations of performing a first wavelet transform 602 (using a first wordlength for a first wavelet transform level, resulting in a first wavelet coefficient), performing a second wavelet transform 604 on the first wavelet coefficient (using a second wordlength for a second wavelet transform level, resulting in a second wavelet coefficient; wherein the first wordlength is different from the second wordlength), and selecting 606 the first wordlength for the first wavelet transform level and the second wordlength for the second wavelet transform level such that selecting different wordlengths for different wavelet transform levels reduces computational complexity.

GLOSSARY

The following terms are used in the description that follows. A definition has been included for these various terms. However, the definition provided should not be considered limiting to the extent that the terms are known in the art. These definitions are provided to assist in the understanding of the present invention.

Adaptive computing system: A broad class of systems that can adapt based on either internal or external instructions. In one embodiment of the present invention such a system may allocate processing load, or throughput priorities, based higher-level system objectives.

ASIC: An acronym for Application-Specific Integrated Circuit. ASICs are generally custom, or quasi-custom, fabricated for a particular application.

Decomposition level: A location in the wavelet decomposition pyramid. The wavelet decomposition pyramid is a pictorial representation of the multiple stages of a wavelet transformation.

FPGA: Field Programmable Gate Array, a broad class of programmable/reprogrammable circuitry. In one embodiment of the present invention the FPGA is a device that optionally allows for real time programming of the computational precision throughout the course of a data processing operation. The precision may be set based on the general expected image type, and empirical data related to which signal components are uninteresting and should deleted. Alternatively the level of precision could be set in real time by a higher order operating system, based on information derived from the signal itself. Another possibility is that a user, optionally at a remote location, could set the precision to enhance certain elements of an output signal that is collected in real time.

Lossless: A data manipulation step wherein, ideally, no data is lost. The wavelet transform in one embodiment of the present invention is lossless. In another embodiment of the present invention present invention the wavelet transform is performed in reduced precision arithmetic, logically there will be some signal loss when the precision is reduced. Such losses do not necessarily render a step lossy for the purposes of the following discussion.

Lossy: A data manipulation operation that results in the loss of data. Often the loss is selective. For instance in one embodiment of the present invention a signal is denoised in a lossy processing step. In another step the precision is reduced for the purpose of sparsening the data. Such a step is said to be lossy.

Maximum usefulness threshold: Beyond the maximum usefulness threshold, additional precision will not materially enhance in the resulting output of the processed data.

Numerical representation: Numerical values can generally be represented as one or more of the following: an integer, non-integer, or an exponent. The non-exponent terms, or mantissa, can take various forms.

Quantization: The intentional sparsening of data, usually performed on the basis of a significance threshold decision. Quantization can take many forms including element deletion, wherein certain elements are completely deleted, or intermediate element value allocation, wherein all elements are made to conform to one of a finite number of values, or element fractalization, wherein multiple components in an area are treated as having identical characteristics.

Variable precision: Wavelets are commonly represented using full precision arithmetic. In the present invention the precision may be optimized using full precision, reduced precision, varying precision, and dynamically varying precision. For the purposes of the present invention variable precision is understood to mean that the precision is allocated using operator or machine specified instructions.

Variable precision arithmetic: In one embodiment of the present invention a wavelet transform is performed in an apparatus wherein the arithmetic precision is programmed into hardware and is variable in time. In another embodiment of the present invention multiple hardware components having varied but fixed precision are employed resulting in a variable degree of precision during the course of the transforms and processing steps. In yet another embodiment a single reduced precision hardware element performs all processing steps in fixed precision.

Visual significance allocation: Scales represent data of varying visual significance. Bits are therefore preferentially allocated to more visually significant scales. Visual response is greatest in the presence of narrowly varying features, which are best represented in lower wavelet scales. Conversely the eye is less sensitive to broadly varying components or higher scales. Therefore, the broadly varying components are generally assigned fewer bits. Because of their attenuated visual significance, scales above a predetermined threshold will not be allocated any bits. Alternate data types have alternate significance criteria.

Wavelet filters: The high and low-pass synthesis and analysis filters used in wavelet transform.

Wavelet transform: A transformation with both "frequency" and "time" (or "space") domain constraints. In a described embodiment, it is a transform consisting of a high-pass filter and a low-pass filter, wherein the rows and the columns are filtered and the resulting coefficients are sub-sampled by 2.

One embodiment of the present invention provides a data compression scheme utilizing a variable precision wavelet transform operator, a post transformation processing system (processor), and a variable precision inverse wavelet transform operator. The wavelet transform may be performed in reduced or variable precision. Subsequent post transformation processing may also be performed in reduced or variable precision. The processed data may also be subjected to additional processing, transmission, or storage before the inverse wavelet transform is performed to produce a reconstructed version of the original input data. The reconstructed version may reflect a sparsened or denoised version of the original input data. The input data may comprise a variety of data types, such as image data or more fundamental basis data such as mathematical systems having either unique or non-unique solutions. The variable precision wavelet transform operator and variable precision inverse wavelet transform operators may comprise multiple sub-operators, each performing one or more operations. In one embodiment, each step in the operation is performed using variable precision arithmetic.

State of the art wavelet transformation systems perform data processing using full arithmetic precision. In many situations, the level of precision used by the hardware exceeds the maximum usefulness threshold. Beyond the maximum usefulness threshold additional precision can detract from the data processing in two ways. First, it needlessly adds to the computational complexity of the data processor. Second, in some situations additional precision can actually result in inferior data products.

Figure 1A:
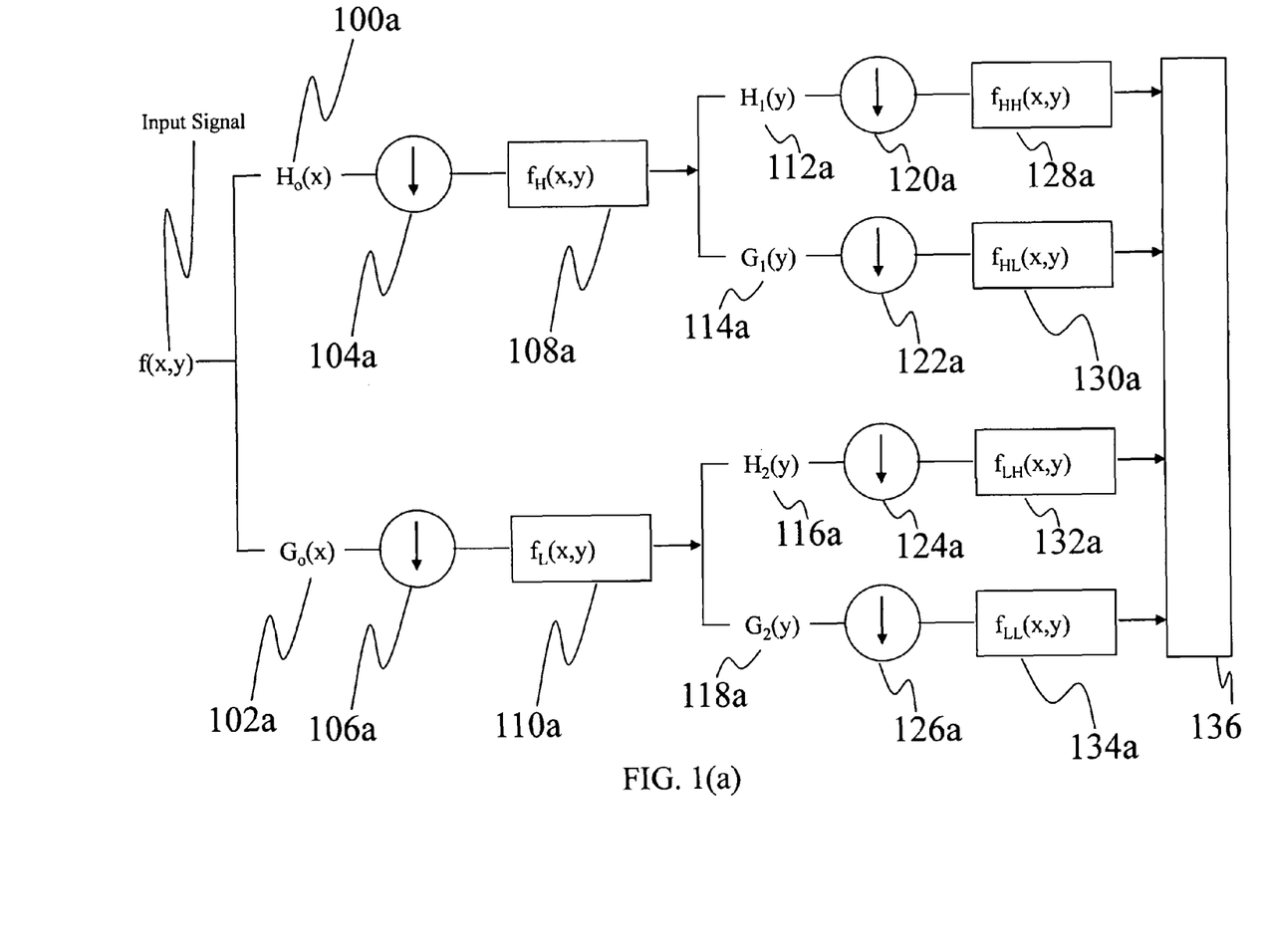
FIG. 1(a) is a block diagram of a wavelet analysis system.
Figure 1B:
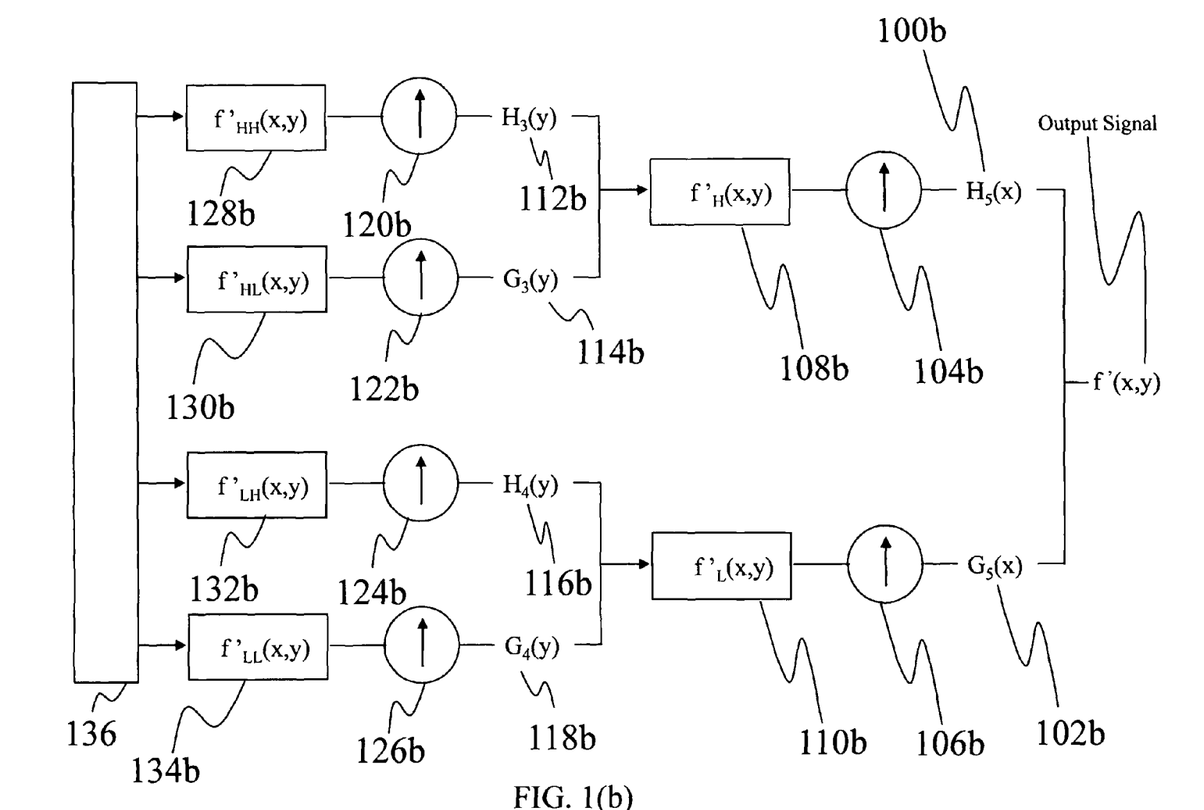
FIG. 1(b) is a block diagram of a wavelet synthesis system.

Block diagrams of a wavelet analysis and synthesis are presented in FIG. 1(a) and FIG. 1(b) respectively. It is anticipated that any or all parts of the transform/processing/inverse transform operations can be performed using variable or reduced precision arithmetic. According to one embodiment of the present invention, a wavelet transform system is defined by a bank of finite impulse response (FIR) analysis filters 100a, 102a, 112a, 114a, 116a, 118a, and a bank of FIR synthesis filters, 100b, 102b, 112b, 114b, 116b, 118b.

Figure 2:
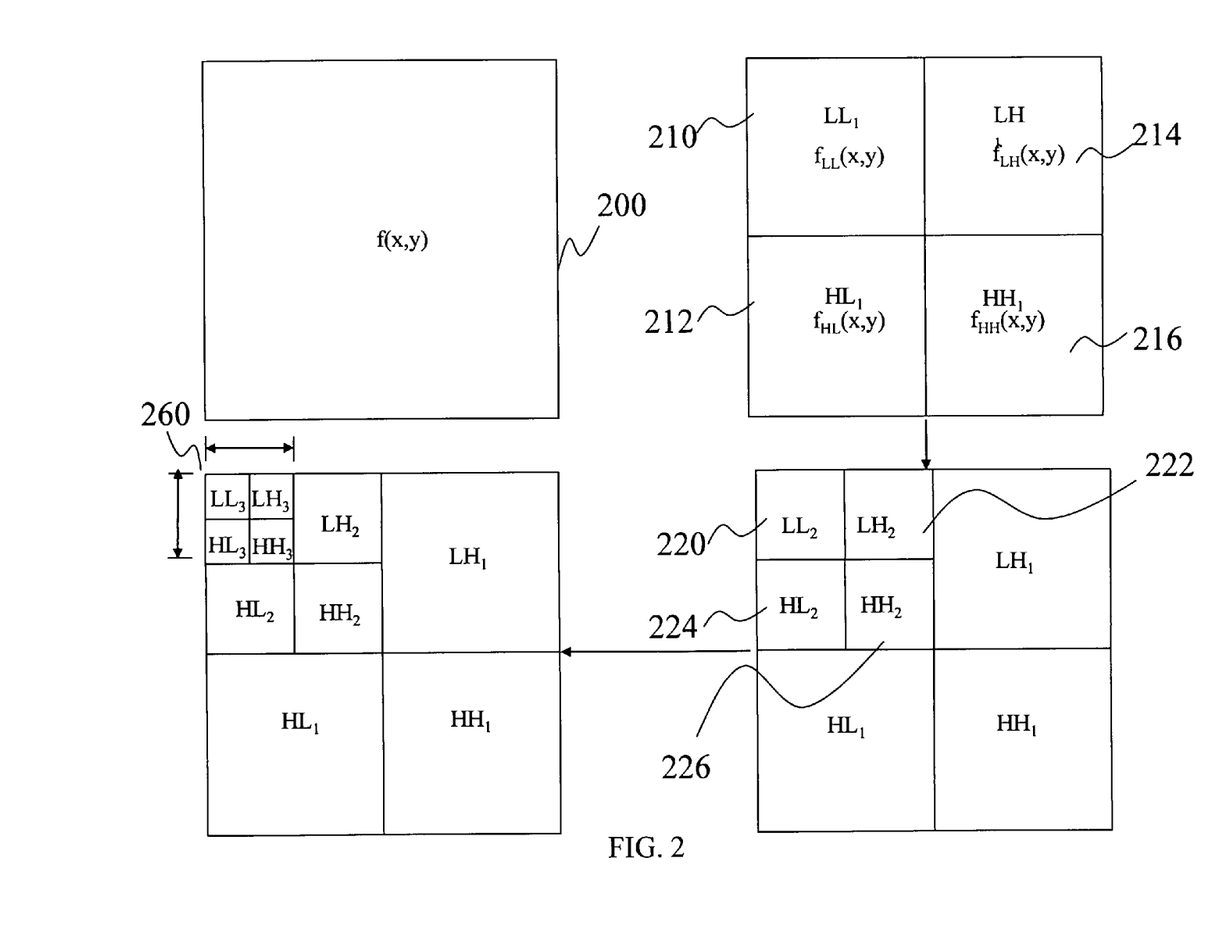
FIG. 2 is a representation of the decomposition pyramid.

In one embodiment of the present invention, an image may serve as the basis for a signal. However, a linear algebra matrix, system of matrices, or other mathematical system, or data set may also be used as the basis. According to the embodiment shown in FIG. 1(a) and FIG. 1(b), all filters beginning with a G designation are low pass filters while all filters beginning with an H are high pass filters. Thus $G_0(x)$ 102a, $G_1(x)$ 102b, $G_1(y)$ 114a, $G_3(y)$ 114b, $G_2(y)$ 118a, and $G_4(y)$ 118b are low-pass filters and $H_0(x)$ 100a, $H_1(x)$ 100b, $H_1(y)$ 112a, $H_3(y)$ 112b, $H_2(y)$ 116a, and $H_4(y)$ 116b are high-pass filters. Referring to FIG. 1(a), for an input signal, f(x,y), the analysis filters $H_0(x)$ 100a and $G_0(x)$ 102a are applied and the resultant outputs are sub-sampled by 2 along the rows 104a and 106a, to generate the transformed data signals $f_L(x,y)$ 110a and $f_H(x,y)$ 108a, referred to herein as low-passed (smooth) and high-passed (detail) coefficients respectively. The high and low-passed signals may each be subjected to further analysis, wherein both of the transformed signals are again filtered $H_1(y)$ 112a, $G_1(y)$ 114a, $H_2(y)$ 116a, and $G_2(y)$ 118a and sub-sampled by 2, this time along the columns as illustrated in 120a, 122a, 124a, and 126a resulting in signal functions $f_{HH}(x,y)$ 128a, $f_{HL}(x,y)$ 130a, $f_{LH}(x,y)$ 132a, and $f_{LL}(x,y)$ 134a. The analysis filter blocks and their corresponding subsampling blocks form the analysis portion of the wavelet transform system. After the wavelet transform analysis is complete, the signals are either passed on for further filtering, as shown in FIG. 2, or may be subjected to computational manipulation. The computational manipulation block 136 contains all the processing, logic, and routines performed in the transformed domain (e.g., prediction, quantization, element zeroing, coding, etc). Some of the operations may be computationally intensive, and may be performed in one or more processors, some or all of which may use variable or fixed reduced precision arithmetic. One specific quantization operation envisioned is the elimination (setting to zero) of coefficients having small magnitudes, i.e. below a specified threshold. Such components may be eliminated with little or no distinguishable distortion to the reconstructed image. After undergoing computational manipulation, the data may be optionally stored, transmitted, and reconstructed. The reconstruction, or synthesis, follows virtually the same routine followed by the wavelet analysis, except in reverse. The synthesis portion, as shown in FIG. 1(b), allows for a reconstruction of the processed signal. The computational block 136 provides outputs, comprising the manipulated signals, which shall be represented as $f_{HH}(x,y)'$, $f_{HL}(x,y)'$, $f_{LH}(x,y)'$, and $f_{LL}(x,y)'$ as labeled 128b, 130b, 132b, and 134b, respectively. Said signals are upsampled by 2 along the columns, 120b, 122b, 124b, and 126b. The resultant upsampled data is then submitted to the synthesizing filters from $H_3(y)$ 112b, $G_3(y)$ 114b, $H_4(y)$ 116b, and $G_4(y)$ 118b. The data from the synthesizing filters, $H_3(y)$ 112b, $G_3(y)$ 114b, $H_4(y)$ 116b, and $G_4(y)$ 118b, are then combined to produce $f_H(x,y)$ 108b and $f_L(x,y)$ 110b, and are up-sampled by 2 along the rows 104b and 106b. The signal components and are then passed through the synthesis filters, $H_5(x)$ 100b and $G_5(x)$ 102b. The output of the synthesis filters $H_5(x)$ 100b and $G_5(x)$ 102b are then combined to produce $f(x,y)'$, where $f(x,y)'$ is generally not equal to $f(x,y)$, but rather generally reflects a denoised, sparsened, or otherwise processed signal.

The synthesis operation, unlike the analysis operation, will generally be performed using fixed precision arithmetic. The use of variable precision arithmetic, to the extent that the precision is reduced, may result in an undesirably lossy signal transformation. The synthesis operation is generally not intentionally lossy. Therefore, precision will generally be allocated such that essentially no material losses will occur during the reconstruction of $f(x,y)$.

The wavelet transformation, or signal decomposition, described above and illustrated in FIG. 1(a) and FIG. 1(b) was limited to a single pyramid level, the number of levels is variable and is generally optimized for a specific application. In one embodiment of the present invention, an image will serve as the basis for a signal 200, as shown in FIG. 2. The first level of decomposition leads to four different bands of coefficients, referred to herein as $LL_1$ 210, $HL_1$ 212, $LH_1$ 214, and $HH_1$ 216. The letter designations L and H stand for low and high, respectively, corresponding to the application of smooth and detail filters respectively. Hence, the $LL_1$ 210 band consists of coefficients from the smooth filter in both row and column directions.

Each subblock in a wavelet decomposition can be further decomposed. The most common practice is to only decompose the $LL_1$ 210 sub-block further, but the choice of sub-block decomposition will vary with application. The decomposition can be done virtually any number of times. FIG. 2 depicts a three-level decomposition. Such a multiple decomposition is termed pyramid decomposition. The letter designation $LL_n$, $LH_n$, $HL_n$, and $HH_n$ with subscripted decomposition number n denote each decomposition sub-block and level.

If the reversible wavelet transform is recursively applied to an image or other data, the first level of decomposition operates on the finest detail, or resolution. At a first decomposition level, the image or data is decomposed into four sub-bands, designated $LL_1$ 210, $HL_1$ 212, $LH_1$ 214, and $HH_1$ 216. Each sub-band represents a band of spatial frequencies. The process of decomposing the original image involves subsampling by two in both horizontal and vertical dimensions, such that the first level subbands $LL_1$ 210, $HL_1$ 212, $LH_1$ 214, and $HH_1$ 216 each have one-fourth as many coefficients as the input has pixels (or coefficients) of the image, as shown in 200.

Subband $LL_1$ 210 contains simultaneously low frequency horizontal and low frequency vertical information. Typically a large portion of the image or data energy is concentrated in this subband. Subband $LH_1$ 214 contains low frequency horizontal and high frequency vertical information (e.g., horizontal edge information). Subband $HL_1$ 212 contains high frequency horizontal information and low frequency vertical information (e.g., vertical edge information). Subband $HH_1$ 216 contains high frequency horizontal information and high frequency vertical information (e.g., texture or diagonal edge information).

Decomposing the low frequency LL subband of the preceding level n−1 produces each of the succeeding decomposition levels n. Thus, sub-band $LL_1$ 210 of the first level is decomposed to produce subbands $LL_2$ 220, $LH_2$ 222, $HL_2$ 224, and $HH_2$ 226 of the moderate detail second level. Similarly, subband $LL_2$ is decomposed to produce coarse detail subbands $LL_3$, $LH_3$, $HL_3$ and $HH_3$ of the third level, as shown in 260. Due to subsampling by 2, each second level subband is one-sixteenth the size of the original image. Each sample at this level represents moderate detail in the original image at the same location. Similarly, each third level subband is 1/64 the size of the original image. Each sample at this level corresponds to relatively coarse detail in the original image at the same location.

Since the decomposed images contain less data than the original image due to subsampling, the same memory used to store the original image signal can be used to store all of the decomposed subbands. In other words, the original image and decomposed subbands $LL_1$ 210 and $LL_2$ 220 are discarded and are not stored in a three level decomposition. Although only three subband decomposition levels are shown, fewer or additional levels may be developed depending on the specific application.

Figure 3:
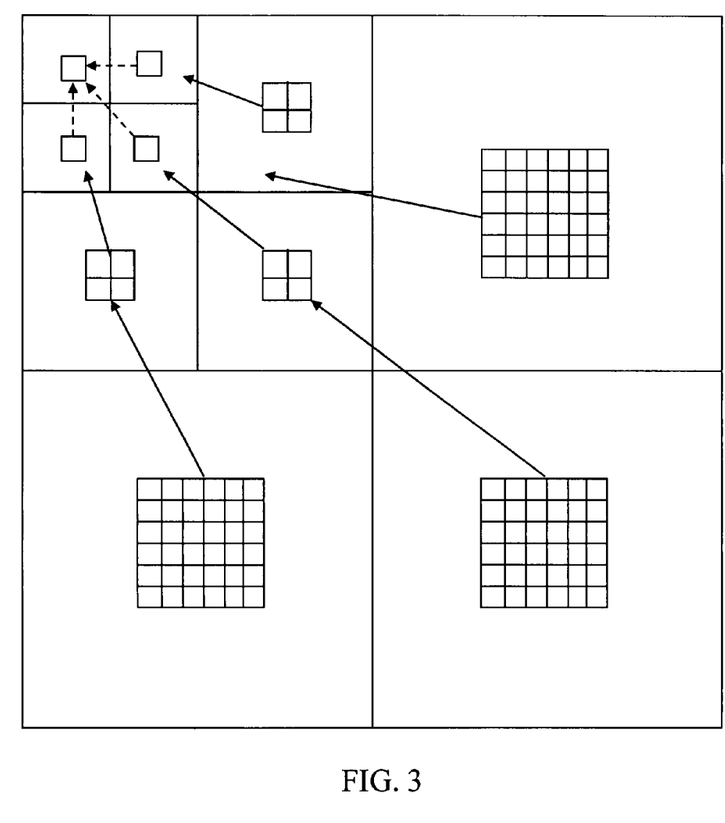
FIG. 3 illustrates the relationship between two consecutive levels of decomposition pyramid.

There is a single LL subblock corresponding to the last level of decomposition but there are as many LH, HL, and HH bands as number of levels. There is a natural and useful tree structure to wavelet coefficients in a pyramidal decomposition. The tree structure defines the parent of a coefficient in a frequency band to be a coefficient in a same frequency band at a lower resolution and related to the same spatial locality. The parental relationship between two consecutive levels is shown in FIG. 3.

Noise in images generally comes in two forms. First is random noise, which generally is not predictably recurrent. Second is fixed pattern noise, which can be caused by many factors, including the difference in offset and gain between the detector elements.

In one embodiment of the present invention, a variable precision arithmetic-based wavelet transform is used to selectively remove the low frequency fixed pattern noise by zeroing out resolution levels corresponding to the lowest spatial frequencies. The remaining portions of the transformed image are subjected to a global or local thresholding scheme whereby random noise is effectively squelched.

Allocating different arithmetic precisions to operations (such as addition and multiplication) for different wavelet scale factors leads to reduced hardware computational complexity. In the area of non-uniformity correction for infrared (IR) imaging sensors, significant increases in performance (as measured by peak signal to noise ratio (PSNR)) are observable by allocating different precisions to different scale factors.

Figure 4:
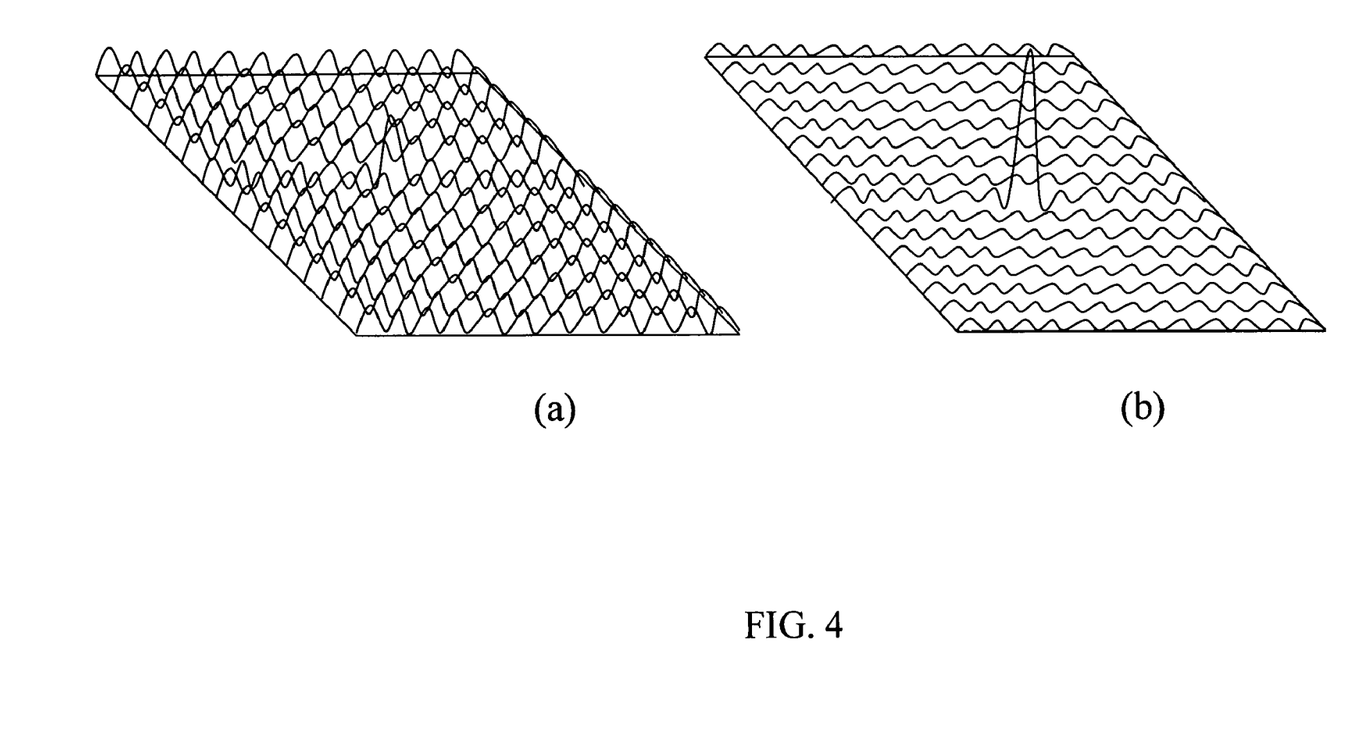
FIG. 4 illustrates how the variable precision arithmetic wavelet transform operates on an image.
Figure 5:
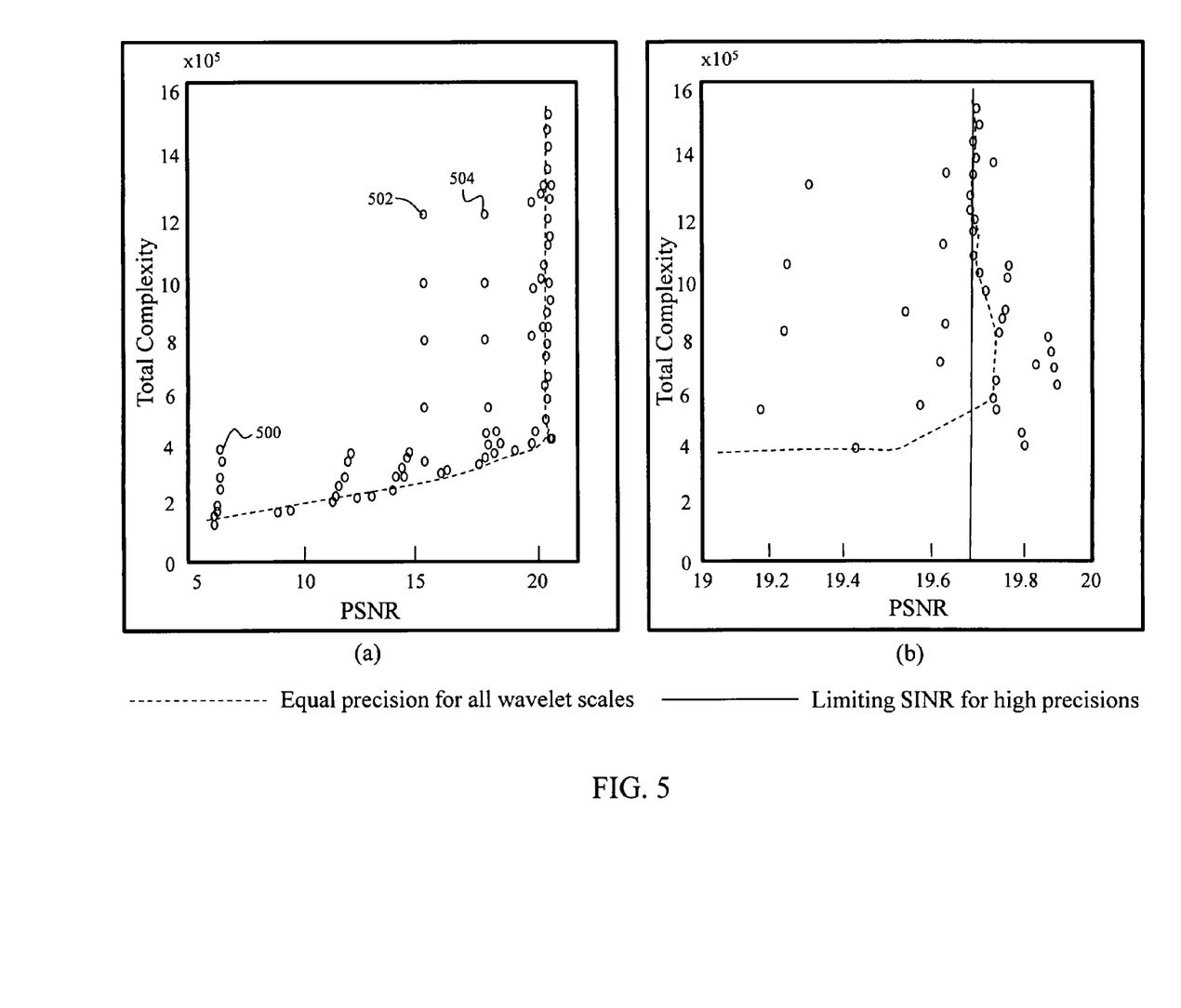
FIG. 5 illustrates the relationship between computational complexity and arithmetic precision.

The collection of a typical noisy signal is presented in FIG. 4. The signal is presented as a relief map as shown in FIG. 4(a), which could, for example, correspond to an IR image. Within the signal is an object of interest, indicated as a perturbation in the relief map shown in FIG. 4(a). The signal is then transformed into wavelet space, processed, and inversely transformed using variable precision arithmetic as described above. The resultant denoised, sparsened signal is depicted in FIG. 4b. The quality of the signal is generally comparable, or superior, to that resulting from products using conventional full precision arithmetic. The relationship between signal to noise ratio and precision can be both complex and situation dependent. The functional interdependence between the peak signal to noise ratio and the arithmetic precision may vary with wavelet scales. The peak signal to noise ratio does not necessarily monotonically increase with precision, nor does an increase in precision of one bit result in equal improvements in different scale factors. Thus the artisan will appreciate that varying the precision between scale factors can effectively reduce computational complexity while optimizing peak signal to noise ratios. FIG. 5(a) shows how the signal to noise ratio varies as a function of computational complexity. Based on the drawings, an artisan will appreciate that beyond a certain point, further increases in precision do not result in any improvement in the peak signal to noise ratio. Furthermore, and notably for example, at points 500, 502, and 504 increasing precision did not result in any peak signal to noise ratio improvement despite additional computational complexity. FIG. 5(b) shows a magnified portion of 5(a), illustrating the surprising and counter-intuitive result that small, but significant, increases in peak signal to noise ratio can be achieved by using less precision.

Hardware implementation of wavelet transform-based processing can exploit variable precision arithmetic through a variety of means. In the case where throughput needs require dedicating hardware to each wavelet scale (level), the specific arithmetic operators (adder, multiplier, etc.) for each scale can be designed for the specific required precision. In this case, a circuit component such as an antifuse FPGA may be used. The antifuse FPGA is distinguished from other classes of FPGAs in that it is only programmed once. Conversely, if the throughput requirements are such that the same hardware is to be used to compute each wavelet scale (level), then variable precision versions of the arithmetic operators (adder, multiplier, etc.) may be used. Methods to accomplish this include using hardware that can perform serial-serial arithmetic, parallel serial arithmetic, digital serial-digital serial arithmetic, parallel-digital serial arithmetic, and online arithmetic. All of these operations can be performed serially in time and can directly trade time for precision. Reconfigurable computing systems using programmable logic devices like SRAM-based FPGAs allow for low cost implementation of these systems. In some situations, it may be desirable to dynamically reconfigure the programmable logic device with optimum arithmetic precision for each scale factor.

In situations where signal statistics vary over time, as with an image where scenery changes, the optimal allocation of precision to the arithmetic operations for the wavelet scale varies. Well-known adaptive techniques may be used to modify the precision of the arithmetic for adaptively changing emphasized signal content. Using either serial or reconfigurable techniques, adaptive computing systems may be built that can allocate processing load, or throughput priorities, based higher-level system objectives.

What is claimed is:

1. A computer-implemented method for wavelet transformations having a plurality of wavelet transform levels corresponding to scale factors, the method comprising an act of causing a specifically encoded processor to perform encoded operations of:
    performing a first wavelet transform using a first wordlength for a first wavelet transform level, resulting in a first wavelet coefficient; and
    performing a second wavelet transform on the first wavelet coefficient using a second wordlength for a second wavelet transform level, resulting in a second wavelet coefficient,
    wherein the first wordlength is different from the second wordlength such that each wavelet transform level uses a different wordlength; and
    selecting the first wordlength for the first wavelet transform level and the second wordlength for the second wavelet transform level such that selecting different wordlengths for different wavelet transform levels reduces computational complexity.

2. The method of claim 1, wherein the acts of performing the first wavelet transform and the second wavelet transform comprise an act of utilizing a variable precision wavelet filter, wherein the variable precision wavelet filter has the first wordlength when performing the first wavelet transform and the second wordlength when performing the second wavelet transform.

3. The method of claim 1, wherein the act of performing the first wavelet transform comprises an act of utilizing a first wavelet filter having the first wordlength, and the act of performing the second wavelet transform comprises an act of utilizing a second wavelet filter having the second wordlength.

4. The method of claim 1, wherein selecting different wordlengths for different wavelet transform levels optimizes a peak signal to noise ratio.

5. An apparatus for performing wavelet transformations having a plurality of wavelet transform levels corresponding to scale factors, the apparatus comprising:
    a processor;
    a memory executable by the processor for performing wavelet transformations having a plurality of wavelet transform levels corresponding to scale factors;
    the processor including:
    a first wavelet synthesis filter of a first wavelet transform level having a first wordlength and a first output for outputting a first wavelet coefficient; and
    a second wavelet synthesis filter of a second wavelet transform level having a second wordlength connected with the first output of the first synthesis wavelet filter, for receiving the first wavelet coefficient,
    wherein the first wordlength is different from the second wordlength such that each wavelet transform level uses a different wordlength, whereby using different wordlengths for different wavelet transform levels reduces computational complexity.

6. The apparatus of claim 5, wherein using different wordlengths for different wavelet transform levels optimizes a peak signal to noise ratio.

7. An apparatus, comprising:
    a processor;
    a memory executable by the processor;
    the processor including:
    a variable precision wavelet filter having a variable wordlength, a filter output and a filter input; and
    a sampler connected with the filter output, the sampler having a sampler output which is connected with the filter input, wherein the variable wordlength is set to a first value a first time data is passed through the variable precision wavelet filter, and the variable wordlength is set to a second value a second time data is passed through the variable precision wavelet filter, wherein the first value and the second value are different from each other, such that varying the wordlengths reduces computational complexity.

8. The apparatus of claim 7, wherein the variable precision wavelet filter is selected from a group consisting of: a field programmable gate array and an application specific integrated circuit.

9. The apparatus of claim 7, wherein varying the wordlengths optimizes a peak signal to noise ratio.

* * * * *